(12) United States Patent
Sikharulidze

(10) Patent No.: US 7,362,406 B2
(45) Date of Patent: Apr. 22, 2008

(54) ELECTROPHORETIC LIQUID CRYSTAL DISPLAY DEVICE

(75) Inventor: David Sikharulidze, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 186 days.

(21) Appl. No.: 10/950,806

(22) Filed: Sep. 28, 2004

(65) Prior Publication Data

US 2005/0094087 A1    May 5, 2005

(30) Foreign Application Priority Data

Oct. 30, 2003    (GB)    .................................. 0325308.5

(51) Int. Cl.
| C09K 19/52 | (2006.01) |
| C09K 19/60 | (2006.01) |
| C09G 3/34 | (2006.01) |
| G02B 26/00 | (2006.01) |

(52) U.S. Cl. ...................... 349/166; 349/165; 345/107; 359/296

(58) Field of Classification Search ................ 349/166, 349/165

See application file for complete search history.

(56) References Cited

U.S. PATENT DOCUMENTS

| 4,305,807 | A | * | 12/1981 | Somlyody ................... 349/166 |
| 5,598,285 | A | * | 1/1997 | Kondo et al. .................. 349/39 |
| 6,441,881 | B1 | | 8/2002 | Enomoto et al. |
| 6,650,384 | B2 | * | 11/2003 | Oguchi et al. ................. 349/86 |
| 6,741,387 | B2 | * | 5/2004 | Shigehiro et al. ............ 359/296 |
| 6,908,036 | B2 | * | 6/2005 | Koshimizu et al. .......... 235/492 |
| 6,982,178 | B2 | * | 1/2006 | LeCain et al. ................. 438/22 |
| 2001/0040651 | A1 | * | 11/2001 | Toko ............................ 349/86 |
| 2002/0135860 | A1 | * | 9/2002 | Iwanaga et al. ............ 359/296 |
| 2006/0153979 | A1 | | 7/2006 | Asakura et al. |

FOREIGN PATENT DOCUMENTS

| EP | 1016895 | 7/2000 |
| EP | 1154312 | 11/2001 |
| WO | 02100155 | 12/2002 |

OTHER PUBLICATIONS

R.C.Liang et al; "Microcup Electrophoretic Displays by Roll-to-Roll Manufacturing Processes"; SiPix Imaging, Inc. Milpitas, California; IDW'02; pp. 1337-1340; EP2-2 INVITED.

(Continued)

*Primary Examiner*—Michael H. Caley
(74) *Attorney, Agent, or Firm*—Lowe Hauptman Ham & Berner, LLP

(57) ABSTRACT

An electrophoretic liquid crystal display device comprises:
  two opposed cell walls enclosing a layer of an electrophoretic composition comprising a liquid crystal material having finely divided pigment particles dispersed therein;
  a plurality of electrode structures on an inner surface of each cell wall for applying an electric field across at least some of the liquid crystal material, overlapping regions of opposed electrode structures on each cell wall defining pixels;
  wherein the liquid crystal material has a dielectric anisotropy greater than about 2 or less than about −2; and
  wherein at least one of said cell walls is translucent and has an inner surface that is of low energy or induces a substantially homeotropic local alignment of adjacent molecules of said liquid crystal material.

27 Claims, 14 Drawing Sheets

OTHER PUBLICATIONS

M.A. Hopper et al.; "An Electrophoretic Display, Its Properties, Model, and Addressing"; IEEE Transactions on Electron Devices, vol. ED-26, No. 8, Aug. 1979; pp. 1148-1152.

Barrett Comiskye et al,; "An electrophoretic ink for all-printed reflective electronic displays"; IEEE Nature, vol. 394 (1998) pp. 253-255.

* cited by examiner

ELECTROPHORETIC LIQUID CRYSTAL DISPLAY DEVICE

BACKGROUND TO THE INVENTION

The present invention relates to an electrophoretic liquid crystal display device.

Electrophoretic display devices have been known for some years. They have the benefit of bistability and high brightness, which are desirable for paper-like reflective-mode displays. The displays typically comprise a pair of opposed substrates provided with electrode patterns on their inner surfaces. Sandwiched between the substrates is a non-conductive liquid in which is dispersed highly scattering or absorbing microparticles. The microparticles become electrically charged, and can be reversibly attracted to one surface of the display by application of a suitable electrical field across the electrode structures. A problem with such displays is that they lack threshold, ie, the particles begin to move at a low voltage, and move faster as a higher voltage is applied. This makes the technology unsuitable for conventional multiplexed (matrix-addressed) displays, which require a relatively sharp threshold to reduce crosstalk.

It has been proposed in U.S. Pat. No. 4,305,807 to achieve a threshold by using a liquid crystal as the non-conductive liquid. The inner surfaces of both substrates are treated to give uniform planar alignment, in which the liquid crystal molecules lie substantially flat in the absence of an applied voltage with the director at the front surface being parallel to the director at the rear surface. When a voltage of sufficient magnitude is applied, the liquid crystal molecules switch from the planar alignment to a homeotropic alignment in which they align parallel to the electric field, perpendicular to the plane of the substrate surface. According to U.S. Pat. No. 4,305,807, the liquid crystal in the homeotropic state now presents relatively low hindrance to motion of the particles because the viscosity of the medium has dropped, permitting the particles to move to a cell wall. The threshold is therefore the threshold switching voltage for the liquid crystal. A problem that we have found with such a display is that the orientational effect can only be realised for small concentrations of particles—less than about 10%. As is known, for a sufficient optical effect, electrophoretic devices are usually doped with 25% or more of pigment particles. Consequently, such devices provide only a weak contrast. We have also found that planar treatment of the surfaces leads to strong sticking and aggregation of the pigment particles to the planar surfaces, so that the device cannot provide good parameters for practical applications.

Recently, a switching threshold has been reported in an electrophoretic device by R C Liang, Jack Hou and Hong-Mei Zang, IDW '02 pp 1337-1340, and in WO 02/100155. The authors describe an active matrix electrophoretic display which has plastic substrates and is manufactured by roll-to-roll technology. The possibility of providing a switching threshold is mentioned and the threshold characteristics of such a device are given, but no explanation is given of how this is achieved. However, the same construction of the electrophoretic display is described by M A Hopper and V Novotny, *IEEE Transactions on electron. devices*, vol. ED-26 No. 8, 1979, pp 1148-1152. Here, the threshold effect is connected with a bonding between the pigment layers and the walls. It is shown that the threshold is quite poor and is not appropriate for a highly informative passive matrix display. Taking into account that the device in *IDW* '02 pp 1337-1340 has a similar construction and that the given threshold characteristic is not sharp enough, there will be some problems for designing a highly informative passive matrix electrophoretic display.

Also known are electrophoretic devices in which the particles move due to a lateral flow effect in a liquid crystal medium.

See, for example, EP 1 154 312. These devices need a complex, in-plane configuration of the electrodes and also the switching is quite slow. Another type of electrophoretic display is described in U.S. Pat. No. 6,441,881, in which a complex arrangement of slanted partitions is provided between the cell walls. The display changes either by movement of particles both from one surface to another and laterally, or by deformation of a liquid-crystal-filled microcapsule.

SUMMARY OF THE INVENTION

According to an aspect of the present invention there is provided an electrophoretic liquid crystal display device comprising:

two opposed cell walls enclosing a layer of an electrophoretic composition comprising a liquid crystal material having finely divided pigment particles dispersed therein;

a plurality of electrode structures on an inner surface of each cell wall for applying an electric field across at least some of the liquid crystal material, opposed regions of electrode structures on each cell wall defining pixels;

wherein the liquid crystal material has a dielectric anisotropy greater than about +2 or less than about −2; and wherein at least one of said cell walls is translucent and has an inner surface that is of low energy or induces a substantially homeotropic local alignment of adjacent molecules of said liquid crystal material.

We have surprisingly found that a display having the above characteristics can provide threshold electrophoretic switching, even when the liquid crystal director remains unchanged, for example when the alignment remains homeotropic before and after switching, or even when the LC molecules are randomly oriented. At same time the device provides fast switching, which is compatible with a standard video rate.

Without wishing to be bound by theory, we believe that these effects are due to the liquid crystal material enabling a sharp change in the dielectric permittivity from a low value to a high value under an electric field, which can significantly control the electrophoretic effect of the particles.

The term "low energy" is used herein to refer to a surface of a cell wall which does not have a strong orientational effect on adjacent liquid crystal molecules and in general does not favour non-controlled sticking of the pigments on the surface. Thus, a low energy surface does not induce uniform planar alignment of the liquid crystal. A low energy surface may result when the cell wall is not provided with any alignment treatment. By providing a low energy or homeotropic inner surface on at least one cell wall, problems of particles sticking to that surface are reduced. In a preferred embodiment, the inner surface of at least one cell wall, preferably of both cell walls, induces local homeotropic alignment.

To enhance contrast of the cell when switched between on and off states it is preferred that the liquid crystal includes a dissolved dye. The dye may be a conventional pleochroic dye of the type used in guest-host LCDs, or it may alternatively be a non-pleochroic dye. The perceived contrast is between the pigment colour (which may be white) at the surface of a cell wall, and the dyed liquid crystal. In an alternative embodiment, the liquid crystal may have two different-coloured pigments dispersed in it, which become differently charged. Thus, depending on the magnitude and sign of an applied voltage, one pigment will preferentially migrate to one of the cell walls, while the other pigment remains dispersed or migrates to the other cell wall. Reversing the sign of the applied voltage will cause this arrangement of pigments to be reversed.

Any suitable pigments may be used in the display and will be well known to those skilled in the art of electrophoretic display manufacture. A preferred pigment is titanium dioxide, which has a high refractive index (n=2.72) and gives good scattering.

A preferred size range for the pigment particles is 100 nm to 1 μm, notably 200 to 500 nm.

It is preferred that the liquid crystal material is nematic, optionally a chiral nematic liquid crystal. However, it is envisaged that smectic liquid crystal materials could also be employed.

Any desired electrode structures may be used and will be well known to those skilled in the art of liquid crystal display manufacture. Suitable electrode structures include, for example, row electrodes on one cell wall and column electrodes on the other. Regions of overlap between row and column electrodes define pixels of the display and may be used for matrix addressing of the display.

The display device may be fabricated using techniques well known per se to those skilled in the art of LCD and electrophoretic display manufactures. According to a further aspect of the invention there is provided a method of manufacturing an electrophoretic liquid crystal display device, the method comprising:

providing two opposed, spaced-apart cell walls, each of which has an electrode structure on an inner surface thereof;

filling a space between said cell walls with a composition comprising a liquid crystal material having finely divided pigment particles dispersed therein and having a dielectric anisotropy greater than about +2 or less than about −2;

providing a peripheral seal around the edges of said cell walls to retain said composition in said space; and wherein at least one of said cell walls is translucent and has an inner surface that is of low energy or tends to induce a substantially homeotropic alignment of adjacent molecules of said liquid crystal material.

Other aspects and benefits of the invention will appear in the following specification, drawings and claims.

The invention will now be further described, by way of example only, with reference to the following drawings.

DETAILED DESCRIPTION

In the following description concentrations are by weight percent (w/w) unless indicated otherwise.

Figure 1:
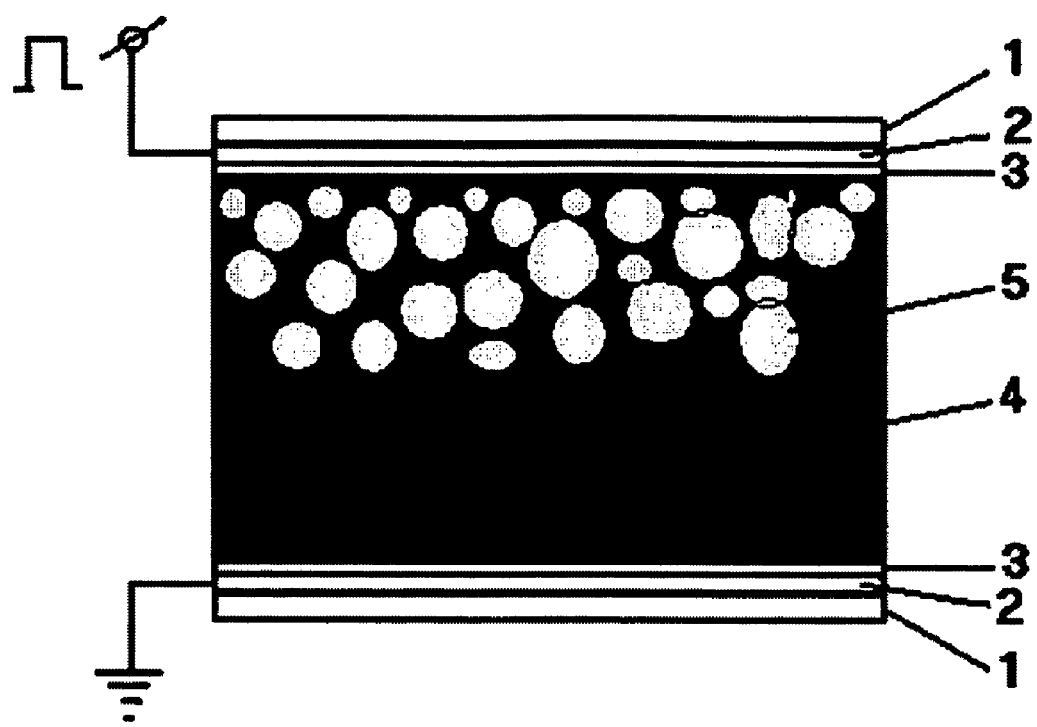
FIG. 1 is a schematic representation of an electrophoretic liquid crystal display device in accordance with an embodiment of the present invention.
Figure 14:
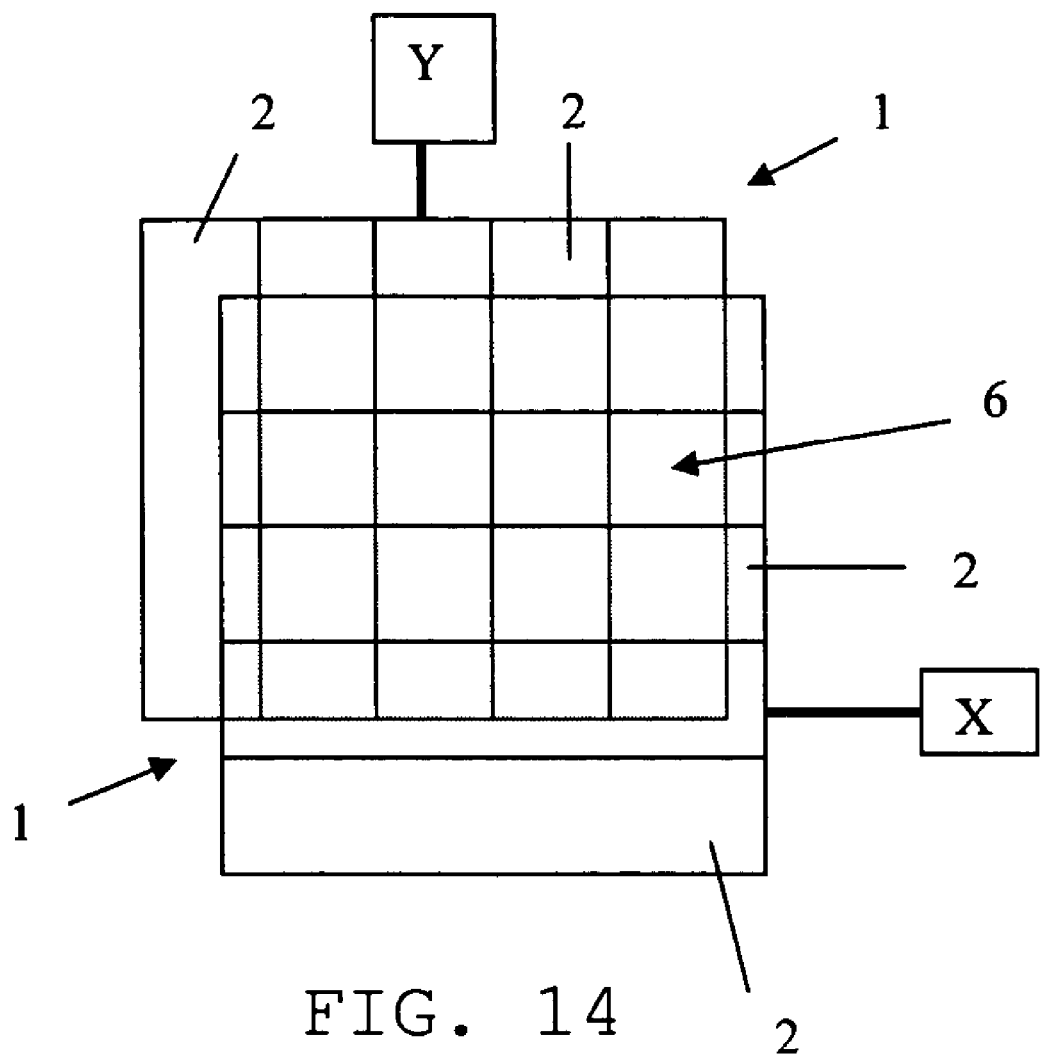
FIG. 14 is a schematic illustration showing overlapping electrode structures on opposed cell walls defining pixels in a display suitable for use in an embodiment of the present invention.

The display device shown in FIG. 1 comprises a pair of opposed transparent cell walls (substrates) 1. The inner surface of each cell wall 1 is provided with transparent electrode structures 2. The cell walls 1 enclose a layer of a dyed nematic liquid crystal material 4 which has finely divided pigment particles 5 dispersed therein. The inner surface of each cell wall 1 is also provided with a thin layer 3 of a polymer which contains a chrome complex that induces local homeotropic alignment of adjacent molecules of the liquid crystal material. The electrode structures 2 are for applying an electric field across at least some of the liquid crystal material. Overlapping regions of opposed electrode structures 2 on each cell wall 1 define pixels 6 between them, as shown schematically in FIG. 14. Each row electrode is driven by an X line driver and each column electrode is driven by a Y line driver in a manner well known per se. For simplicity, only a single X and a single Y line driver are illustrated.

Figure 2A:
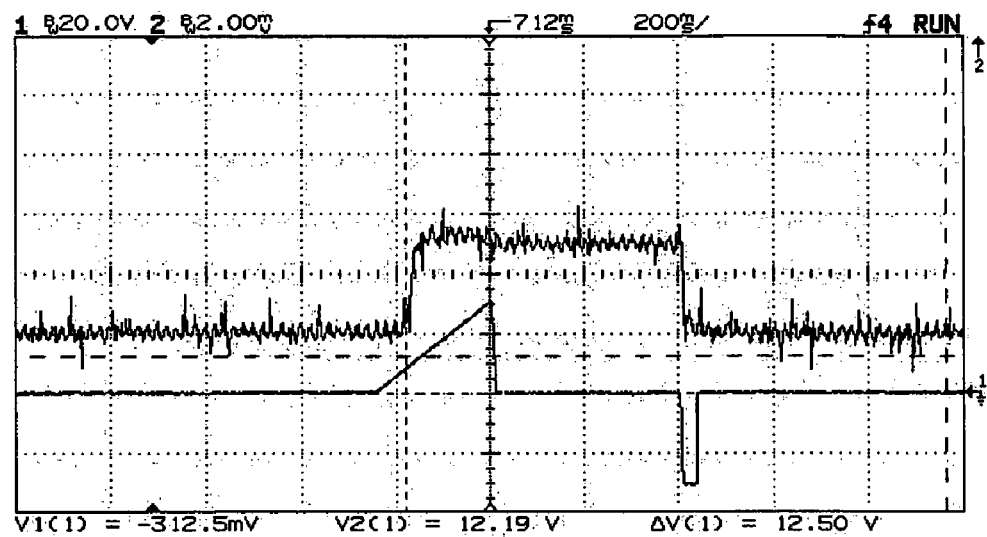
FIG. 2 shows optical responses for an electrophoretic liquid crystal display device in accordance with an embodiment of the present invention and a control display device.
Figure 2B:
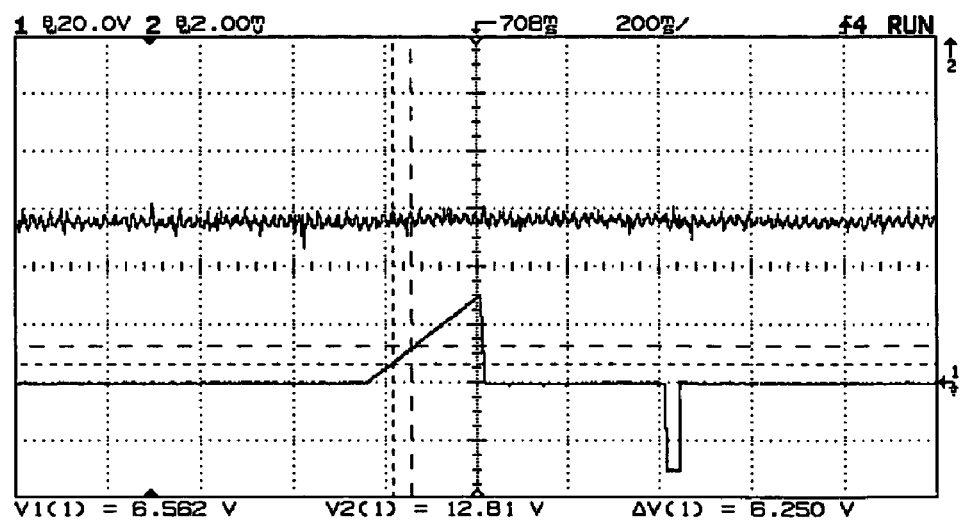

FIG. 2 displays the responses of two LC electrophoretic cells constructed in accordance with the display of FIG. 1. Both cells comprise two glass substrates 1 with transparent ITO electrodes 2 and homeotropic alignment treatments 3. The cell spacing is 10 μm. Each cell was filled with a nematic LC doped with 2% of non-pleochroic dye Oil Blue N and 25% of a white titanium dioxide pigment particles WP10S (size 200-300 nm) from Catalysts & Chemicals Co. Ltd). The cell whose response is shown in FIG. 2a was filled with ZLI2222-000, a nematic LC of positive dielectric anisotropy $\Delta\epsilon$=5.3. The cell whose response is shown in FIG. 2b was filled with ZLI2222-100, a nematic LC of positive dielectric anisotropy Δε=1.8. For each graph the upper curve displays intensity of reflected light from the cell, and the lower curve displays applied voltage (triangle positive and reset negative). The graph shows the threshold behaviour of the switching—for some magnitude of the voltage the switching goes very sharply. We suppose that the anisotropy of the LC medium, which can be controlled by applying voltage, is responsible for this unusual electrophoretic switching. Without wishing to be bound by theory, a possible explanation, for the phenomenon is discussed below. It appears that some parameter such as dielectric permittivity, which very strongly influences the electrophoretic effect, will be different for the different directions in the cell. In general we consider a case of the non-oriented LC medium, which usually characterizes a LC with suspended pigments and also LC mixture with non pleochroic dyes. In the initial state the molecules of the LC will be randomly oriented due to high concentration of the particles in the LC and so the dielectric permittivity of the LC mixture has some average value $<\epsilon>=(\epsilon_{\|}+2\epsilon_{\perp})/3$, where $\epsilon_{\|}$, $\epsilon_{\perp}$ respectively are dielectric permittivities parallel to the long axis of the LC molecule and perpendicular to it. The dielectric interaction results in a sharp reorientation of the LC molecules under a voltage, which is controlled by the dielectric anisotropy ΔE of the LC, according to $V_{th} \sim (1/\Delta\epsilon)^2$, where $V_{th}$ is the threshold voltage of the molecules reorientation. Also the dielectric anisotropy controls a speed of the reorientation of the molecules according to $t \sim \gamma d^2 / K\Delta\epsilon V^2$, where γ is viscosity, d is thickness of the cell, K is an elastic constant, and V is applied voltage. This means that the dielectric anisotropy, which determines the reorientation process of the LC molecules under an electric field, will determine the voltage and the switching speed of the observed electrophoretic effect.

So applying an electrical pulse to the LC with positive dielectric anisotropy $\Delta\epsilon = \epsilon_{\|} - \epsilon_{\perp} > 0$ provides orientation of the molecules along the electrical field and the dielectric permittivity of the LC medium becomes higher. In other words, the vertical orientation of the LC molecules causes a sharp increase in the dielectric permittivity with respect to the low dielectric permittivity of the initial state, which causes the threshold character of the electrophoretic switching. Investigations of LC materials with low dielectric anisotropy (FIG. 2b) give some confirmation of this. This shows that the effect very strongly depends on the dielectric anisotropy of the LC and the effect is not observed for LC materials with low dielectric anisotropy in the same range of voltage.

Figure 3:
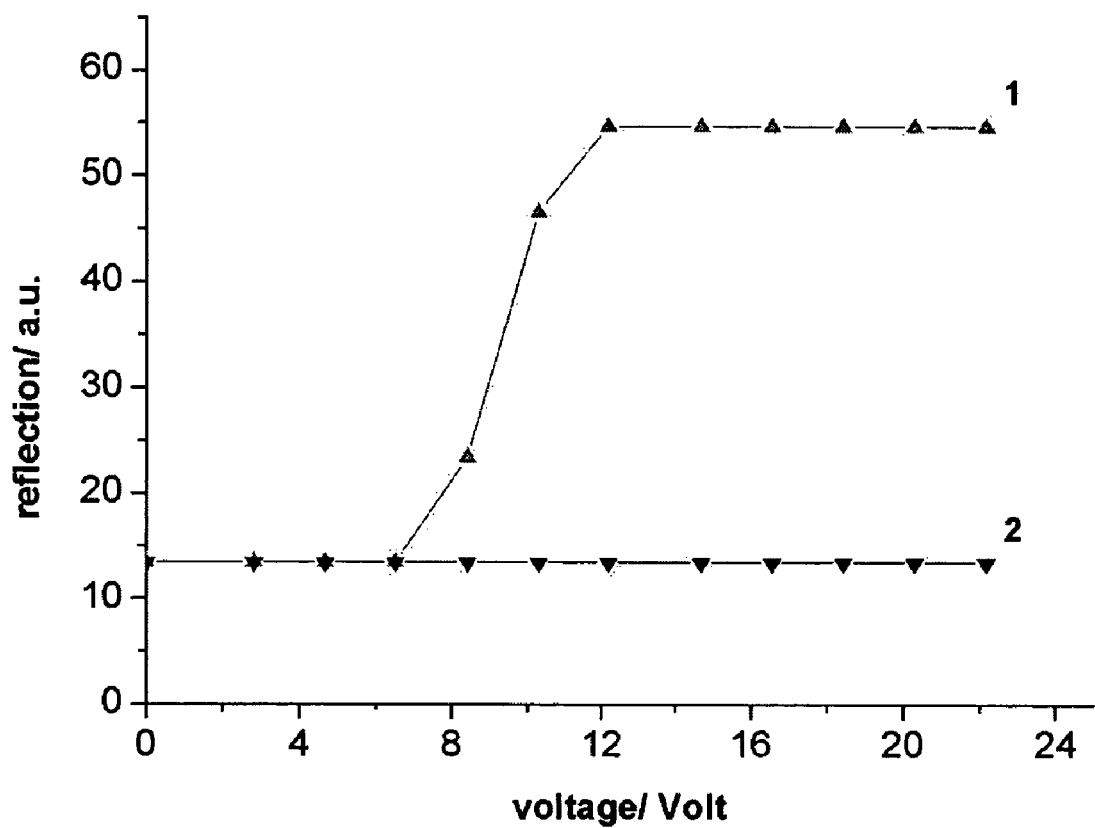
FIG. 3 shows graphs of reflected light intensity against voltage for a device in accordance with an embodiment of the present invention and a control device.

FIG. 3 shows the switching dependence on the voltage. The line labelled "1" is for the cell of FIG. 2a and the line labelled "2" is for the cell of FIG. 2b.

Figure 4A:
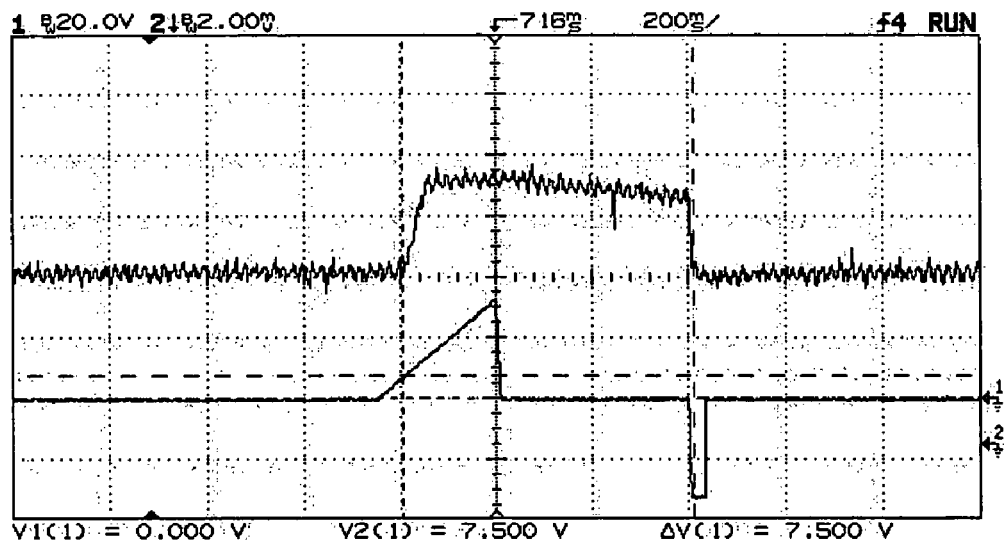
FIG. 4 shows graphs of optical responses for a device in accordance with another embodiment of the present invention and a control device.
Figure 4B:
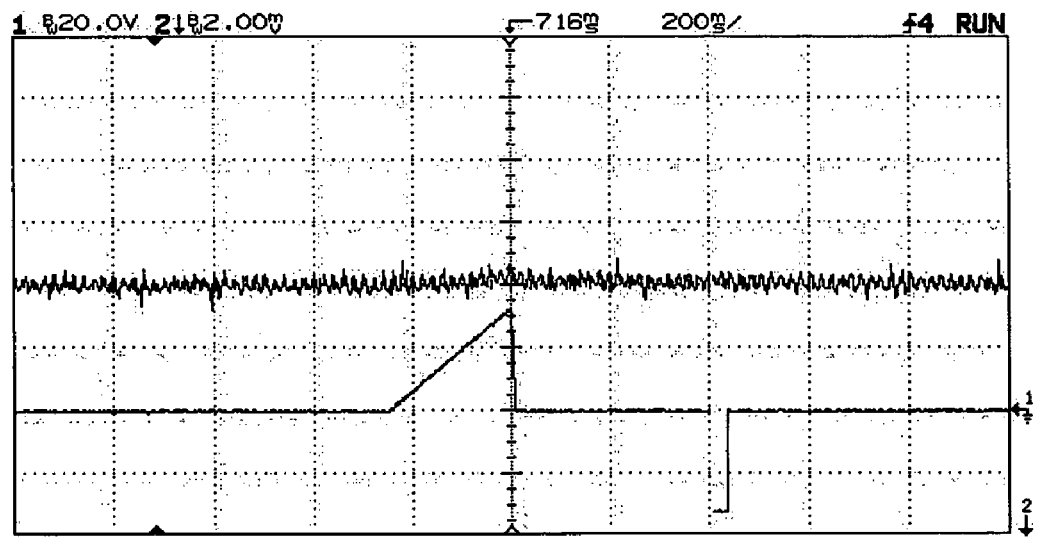
Figure 5:
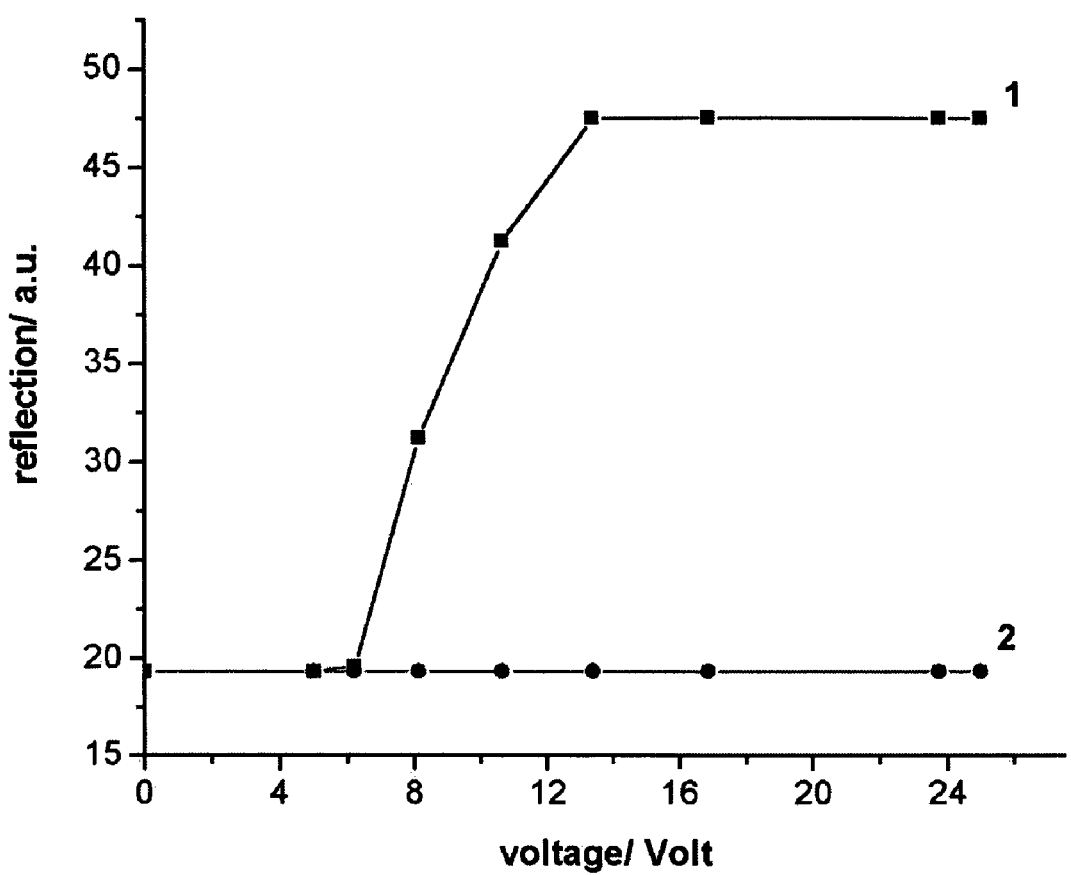
FIG. 5 shows graphs of reflected light intensity against voltage for a device in accordance with another embodiment of the present invention and a control device.

Turning now to FIGS. 4a and 4b, these graphs show results for cells constructed identically to those of FIGS. 2a and 2b, but with the liquid crystals substituted by nematic LCs of negative dielectric anisotropy. The cell whose results are shown in FIG. 4a was filled with ZLI4788-000 (Δε=−5.7); the other was filled with ZLI1831 (Δε=−0.6). FIG. 5 shows switching dependence on voltage. The line labelled "1" is for the cell of FIG. 4a and the line labelled "2" is for the cell of FIG. 4b.

Thus, the cells with LC of negative dielectric anisotropy show the same behaviour as cells with LC of positive dielectric anisotropy, although in this case the molecules are oriented normal to the electrical field and pigment's drifting direction. These results indicate that the viscosity of the LC does not influence switching significantly, as has been proposed in U.S. Pat. No. 4,305,807, as in this case the molecular long axes are normal to the movement direction of the pigments.

We have found that two pigments may be used, instead of one pigment and a dye. In this case the pure nematic LC is doped by two pigments, having different colours and acquiring electrical charges with different polarity. The 10 μm cell was filled by the nematic LC ZLI2293 doped by the white titanium dioxide pigment R102 (which acquires a positive charge) and red iron oxide pigment RP10S (which acquires a negative charge). The coloured pigments move in opposite directions under an applied pulse. The different colours of the pigments provide the contrast, necessary for the image observation.

From the results we can suppose that the electrophoretic effect in this system very strongly depends on the dielectric anisotropy of the LCs, which indicates electrical polarizing capability of the LC molecules under electrical field. The orientation of the LC molecules with high positive dielectric anisotropy induces a large electrical dipole along the electrical field, which will be directed along the long axes of the molecules. This results in the strong interaction between solid particles and LC molecules, which corresponds the electrostatic stabilization. In other words the electric double layer, which determines the electric charge of the particles, will be expanded along the electrical field. This results in a strong electric interaction between the pigments and an external field, which creates strong movement of the pigments along the electric field, towards to the surface of opposite polarity. The investigation shows that in the LC with low dielectric anisotropy the electrophoretic effect does not significantly occur, as it is for example shown in FIGS. 2b and 4b. This is consistent with a weak interaction of the molecules with the particles, and consequently a weak electrical charge of the particles, which is not enough for the significant electrophoretic effect in the practically interesting range of applied voltage 10-80 V and time scale of up to about 10 ms.

It should be noted that our experiments showed strong aggregation and sticking of the pigment close to planar aligned surfaces, stopping or reducing switching in these cells as the following example shows. Referring now to FIG. 6, this shows two graphs for optical responses of a homeoplanar cell. The cell had a similar construction to the previously-described experimental cells, but one inner surface was covered by the rubbed polyimide layer AL1254, providing a planar alignment (LC molecules are parallel to the surface) and the opposite surface was covered by a chrome-complex-containing polymer, providing a homeotropic alignment (the LC molecules are normal to the surface). The cell was filled with nematic LC ZLI2293 (Δε=+10) doped with 11% chiral dopant S811, 4% Oil Blue N dye, and 30% white titanium dioxide pigments WPLOS. Suitable electrical pulses were applied to the cell to drive pigments to one or other of the cell walls where the optical response was measured.

Figure 6A:
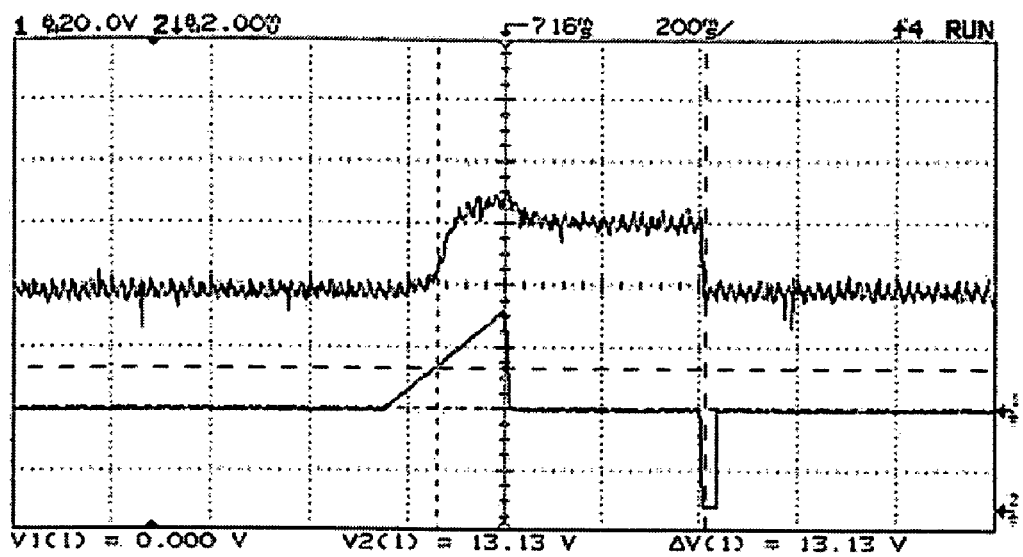
FIG. 6 shows optical response for a device in accordance with a further embodiment of the present invention.
Figure 6B:
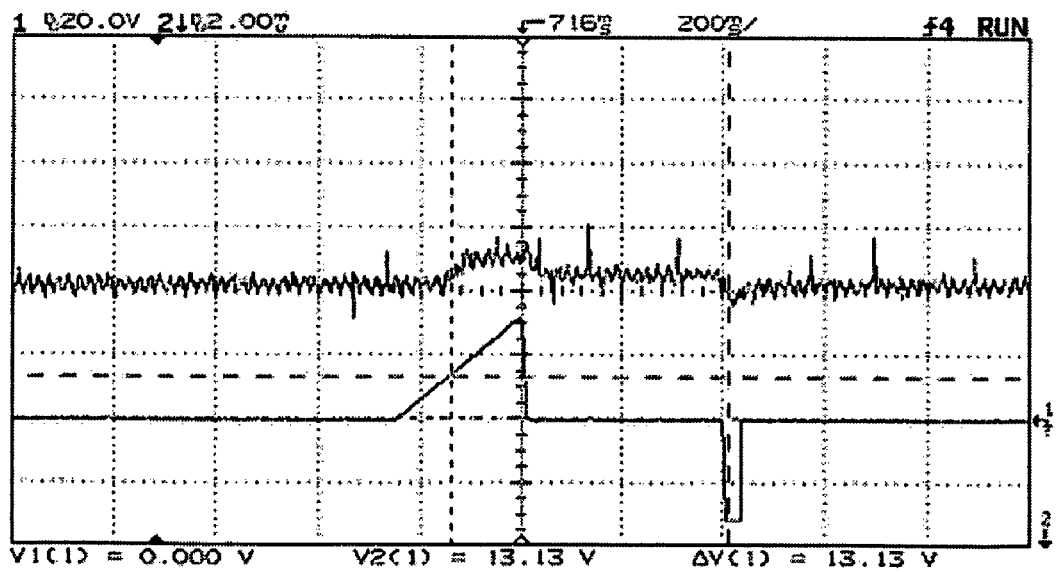

FIG. 6 displays the light reflection during electrooptical switching, detected from the homeotropic(FIG. 6a) and planar (FIG. 6b) sides. The weak modulation of the light from the planar side is explained by the sticking of the pigments on to the inner surface of the cell wall with the planar alignment.

Figure 7:
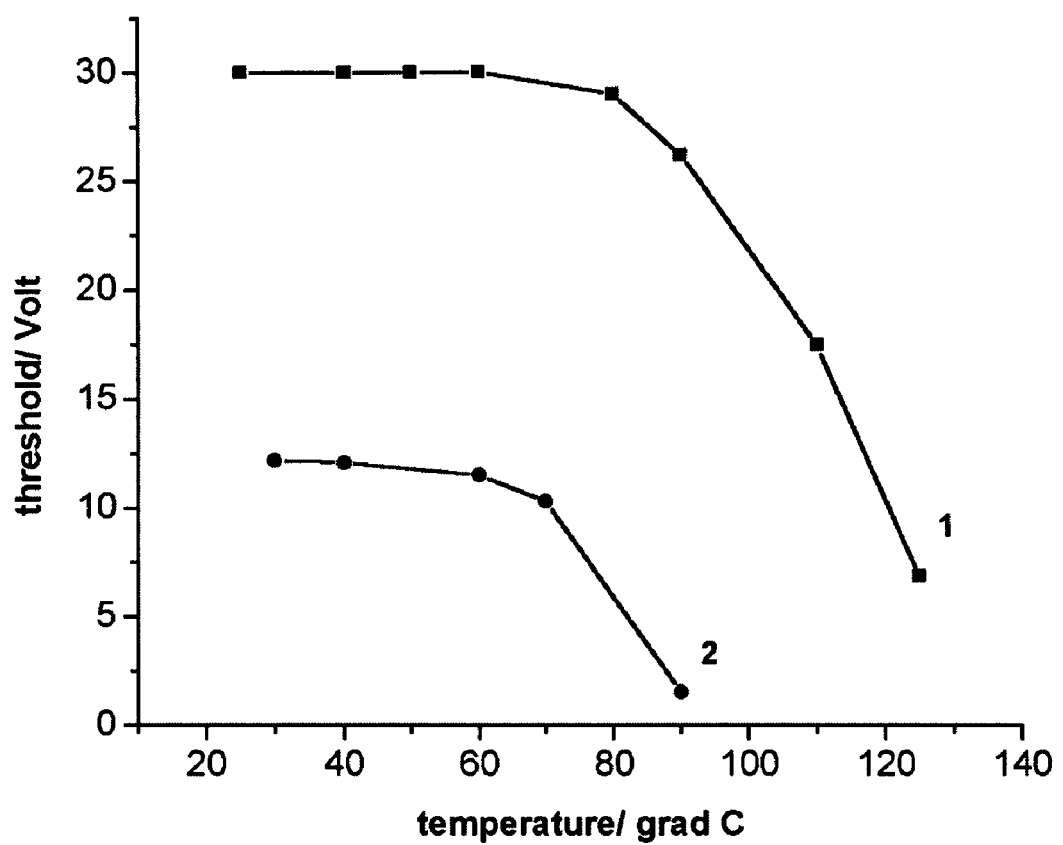
FIG. 7 is a graph showing voltage threshold dependence on temperature for devices in accordance with two embodiments of the invention.

Supporting evidence for the influence of the dielectric anisotropy on the threshold switching is provided by an investigation of electrophoretic LC cells under increasing temperature. FIG. 7 (line 2) shows results for an electrophoretic cell (spacing 10 μm) with ZLI2222-000 (transition temperature from the nematic to the isotropic phase 66° C.). This cell is doped with 2% non-pleochroic dye Oil Blue N and 25% white titanium dioxide pigment particles WP10S. In the isotropic phase the cell loses the threshold and sharpness, and switches under 1 Volt. A similar decreasing of the threshold is observed also in the other cell (line 1). This cell (spacing 10 μm) was filled with nematic LC ZLI4756/2 doped with 4% chiral dopant S811 and 25% white titanium dioxide WP10S. In this case, in the isotropic phase the LC behaves like an isotropic liquid, having a dielectric permittivity that is about half of the sum of perpendicular and parallel dielectric permittivities of the LC. The threshold dependence on temperature in the electrophoretic LC and the dielectric permittivity dependence on temperature in the nematic LC are quite similar.

Figure 8:
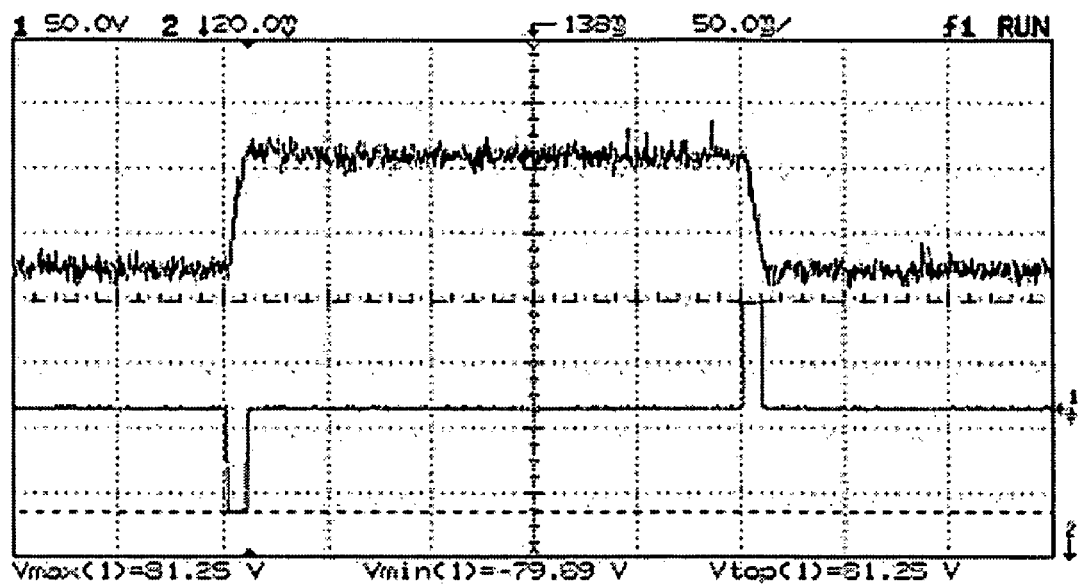
FIGS. 8a,b,c shows optical responses for an electrophoretic liquid crystal display device in accordance with a still further embodiment of the present invention.
Figure 8:
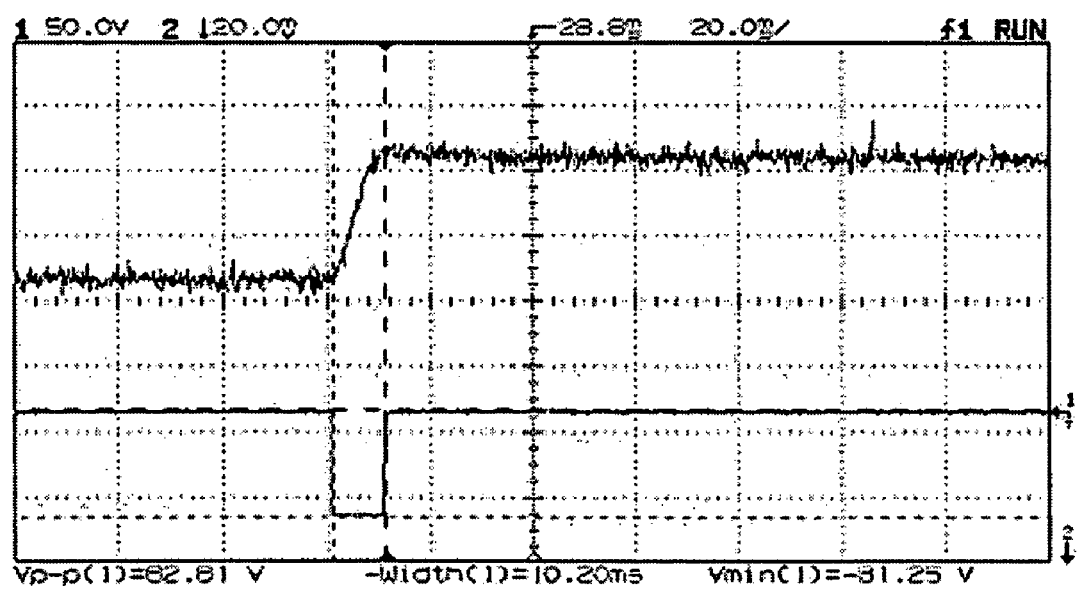
Figure 8:
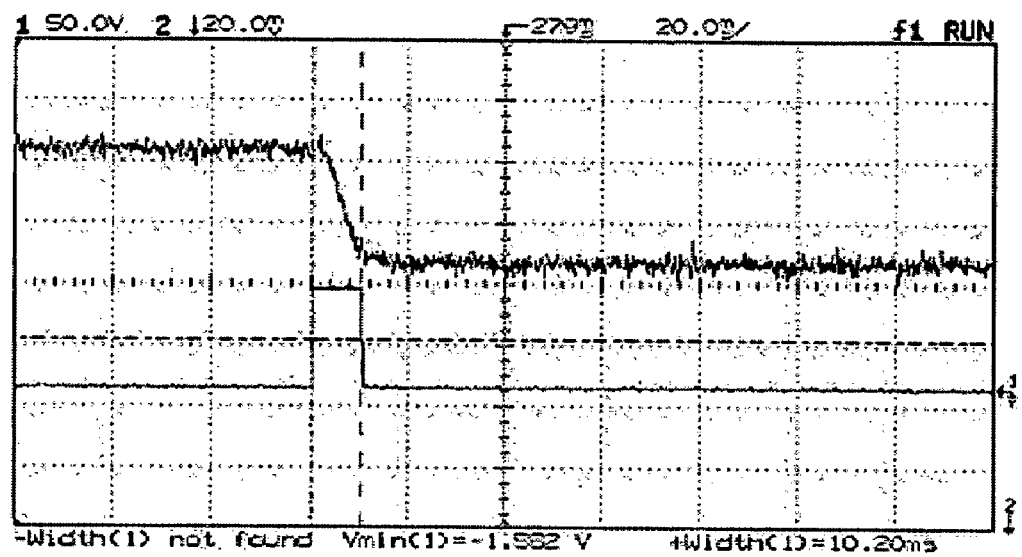
Figure 9:
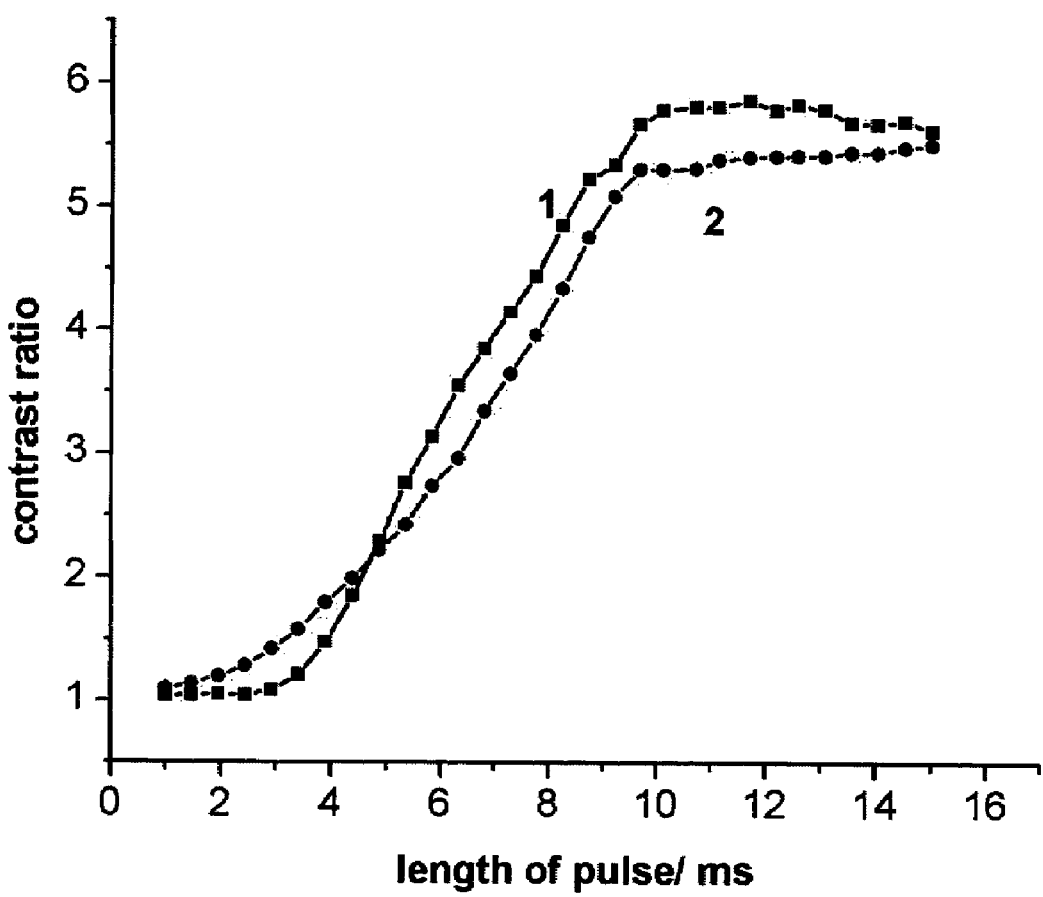
FIG. 9 shows graphs of reflected light intensity against pulse length for a device in accordance with another further embodiment of the present invention.
Figure 10:
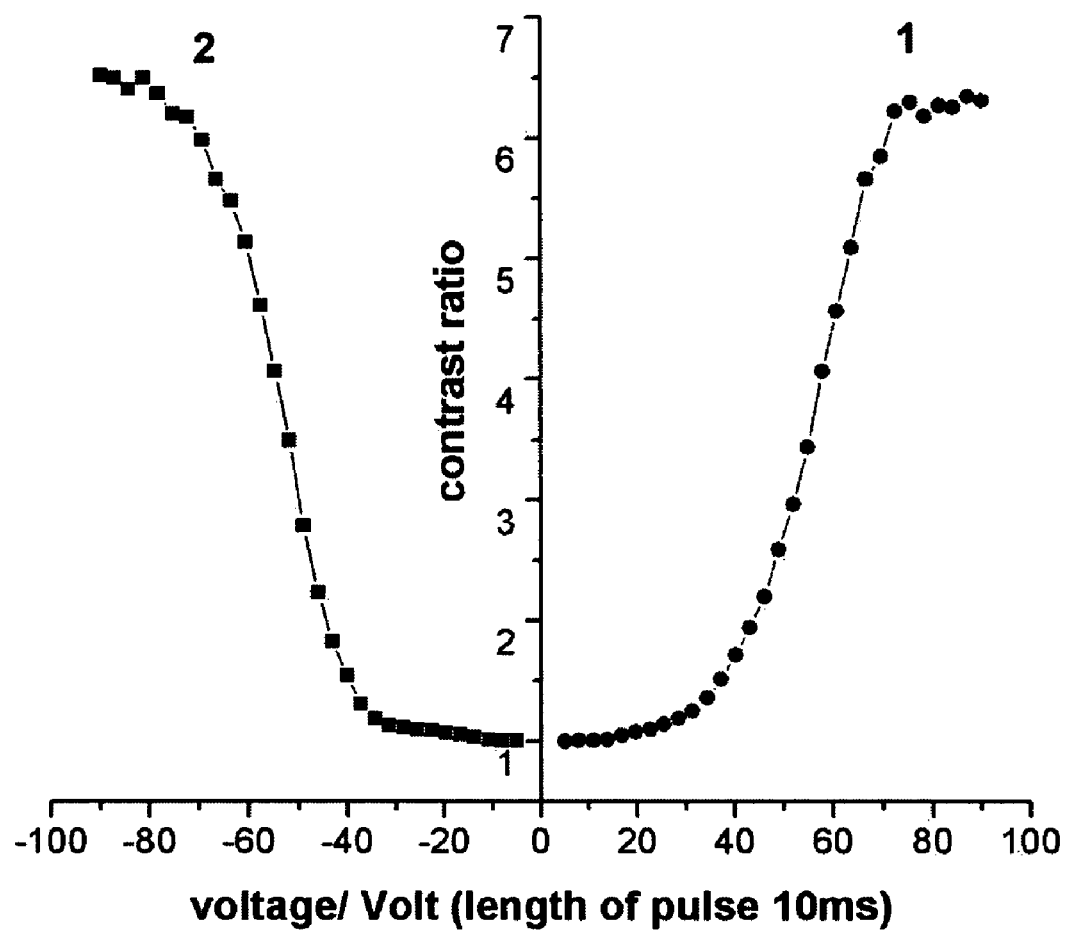
FIG. 10 shows graphs of reflected light intensity against voltage for a device in accordance with an embodiment of the present invention.

A sharp increasing of the dielectric permittivity results in the sharp increasing of the mobility of the nanoparticles, which strongly depends on dielectric permittivity according to the equation $\mu = \epsilon \zeta / 6\pi\eta$, where $\epsilon$ is dielectric permittivity of liquids, $\zeta$ is zeta potential and $\eta$ is viscosity of liquids (B. Comiskye, J. D. Albert, H. Yoshizawa & J. Jacobson *IEEE Nature*, vol. 394, 1998, pp 253-255). The measurement of the mobility μ, provided in the cell with in-plane electrodes gives a value about $2.10^{-6}$ cm$^2$/Vs. Respectively drift time of the pigments, $t = d^2/\mu V$, where d is thickness of the cell and V is applied voltage, determines switching time. In the cell with 10 micron thickness, and applied voltage 60 volt the drifting time will be about 8-10 ms, which determines switching frequency more than 50 Hz. This is in good agreement with experimental results, which have been got from the 10 micron cell filled by LC MLC 6436-000, containing 4% nonpleochroic dye Oil Blue N and 30% white pigments WP10S. FIGS. 8*a,b,c* show the electrooptical responses of the cell under applied electrical pulses. As follows from the pictures, the switching time in both directions is about 10 ms. FIGS. 9 and 10 show the contrast ratio dependences on pulse length and voltage respectively. The curve labelled "1" is for a switching on and the line labelled "2" is for switching off. These measurements show that the cell provides switching time 8-10 ms under applied voltage 60-70 V.

Figure 11A:
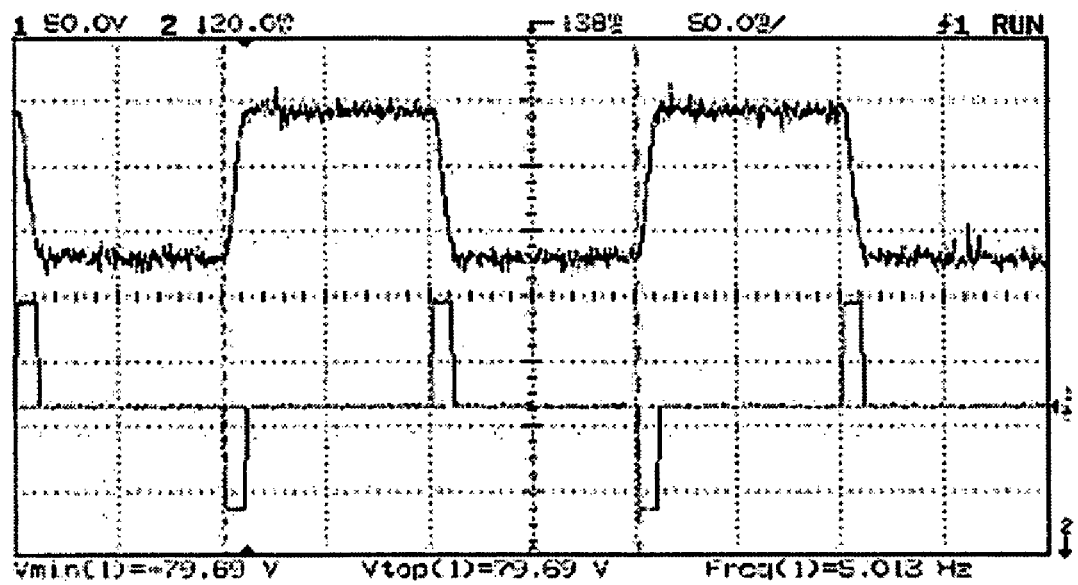
FIG. 11 shows optical responses for an electrophoretic liquid crystal display device in accordance with another embodiment of the present invention.
Figure 11B:
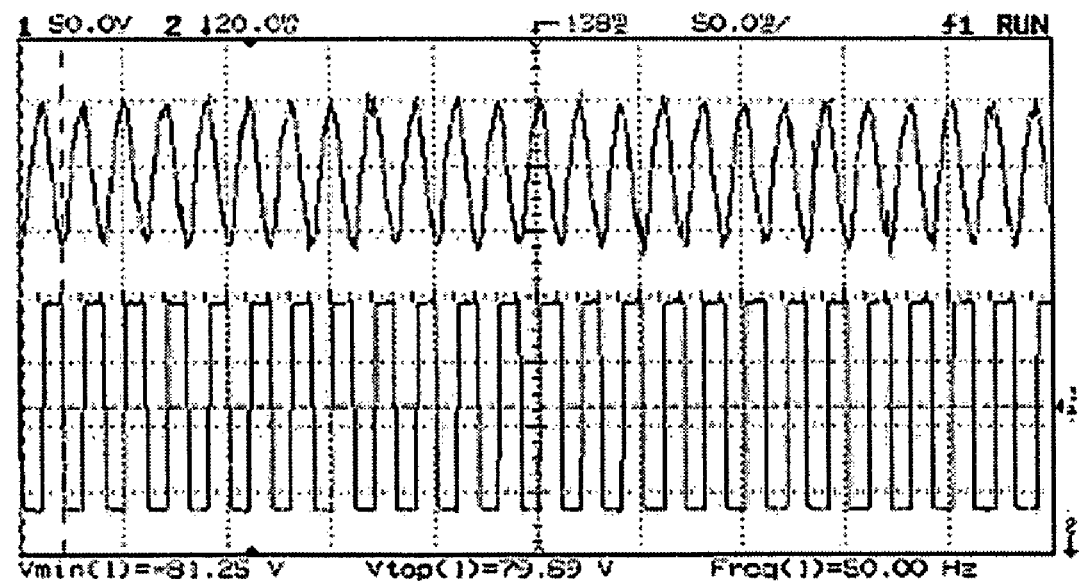
Figure 11:
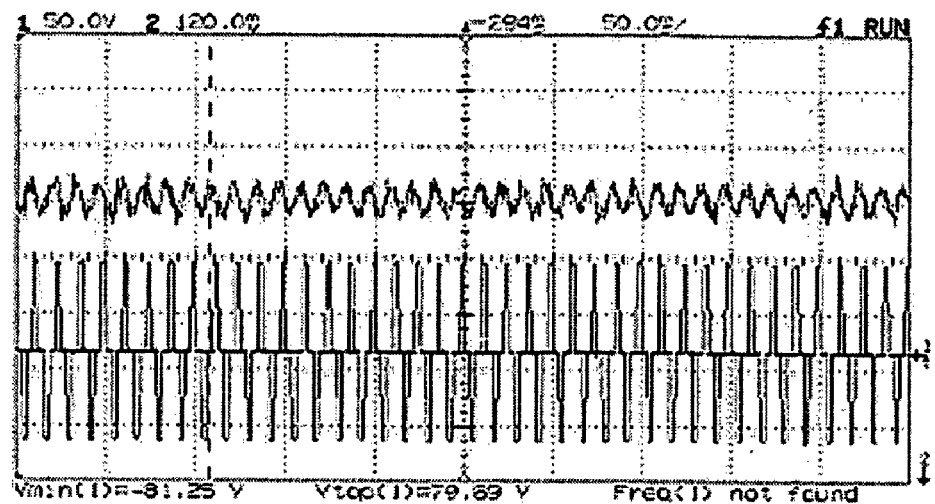
Figure 12:
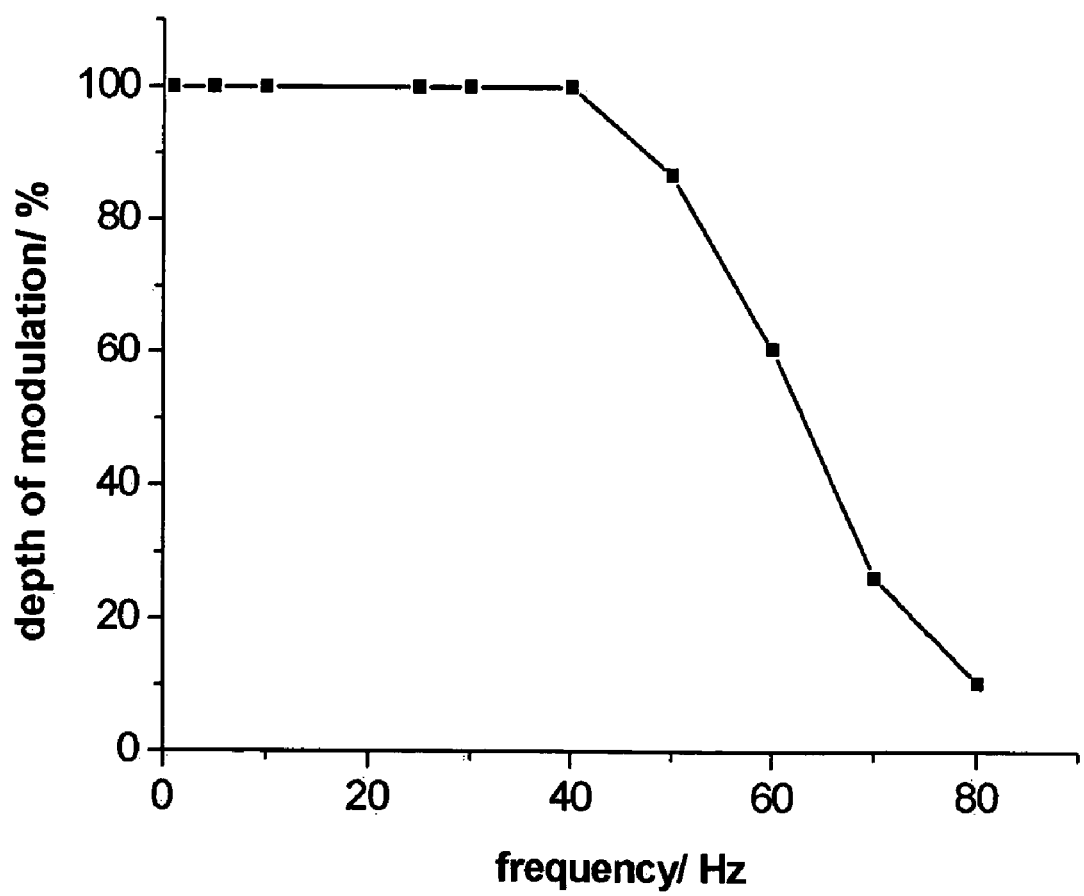
FIG. 12 shows graphs of depth modulation of reflected light intensity against pulse repetition (frequency) for a device in accordance with another embodiment of the present invention.

FIGS. 11*a,b,c* show responses of modulation of the reflected light depending on the pulse repetition at 5, 50 and 80 Hz respectively. FIG. 12 represents a measurement of the depth modulation of reflected light dependence on the pulse repetition. To the cell are applied positive and negative pulses with length 10 ms and amplitude 60 V. As follows from FIG. 12 strong reducing of modulation depth is observed for frequency higher than 70-80 Hz. These results confirm a capability of the electrophoretic liquid crystal display to support video frame rates.

Figure 13:
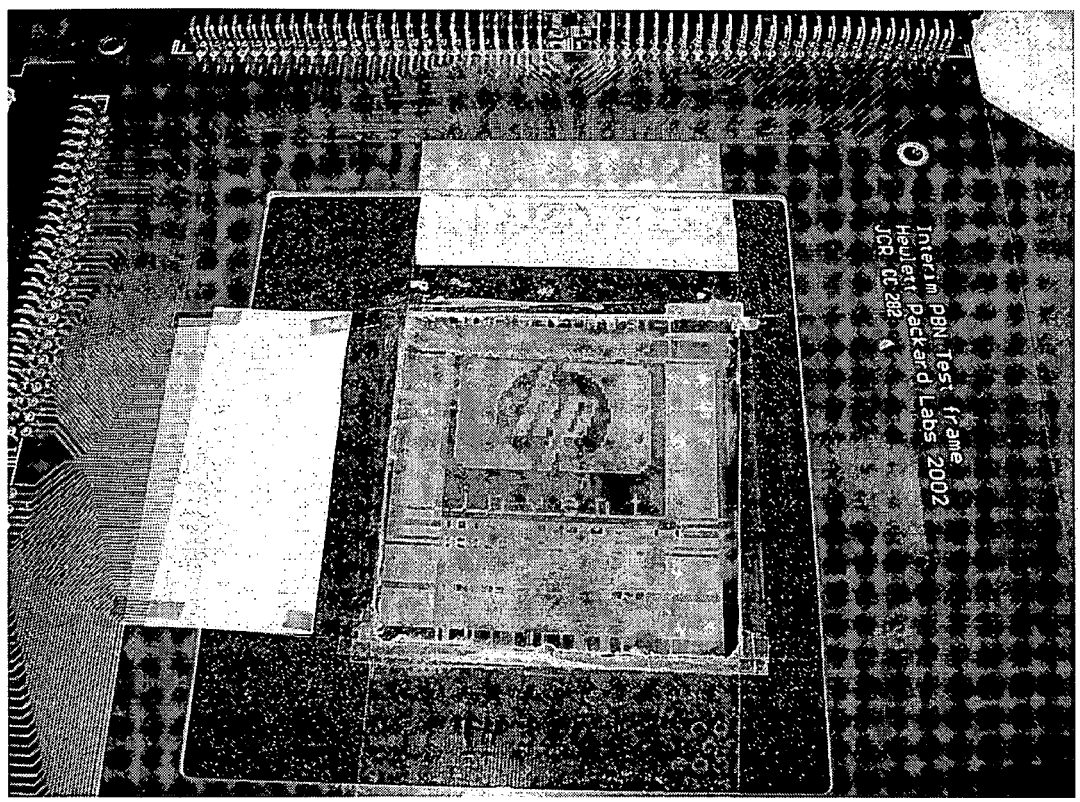
FIG. 13 shows an embodiment of a passive matrix addressed electrophoretic liquid crystal display in accordance with another embodiment of the present invention.

The switching threshold which we have discovered makes this effect very attractive for applications, as it gives the possibility to realize a display with low-cost passive matrix addressing. FIG. 13 shows a picture of a passive matrix addressed display, having cell walls, with 50×60 pixels, formed using 50 row (X) electrodes and 60 column (Y) electrodes, each of which is connected to corresponding X and Y line drivers. Switching occurs when a predetermined threshold voltage or potential difference is present between a row electrode and a column electrode, but not when no potential difference or a potential difference less than the threshold is applied. It will be understood that one electrode may be earthed (grounded) while the other has a voltage or waveform applied to it to provide the potential difference. The effect allows the use of a wide range of commercial LCs and particles and is very compatible with conventional LCD technology.

Experimentally, cells have been constructed from two glass or plastic substrates with transparent ITO electrodes. In some cases, in order to avoid the pigment aggregating close to the surfaces, the ITO electrodes were covered over by protective layers, for example by a thin layer providing a vertical homeotropic alignment of the LC molecules. Polymer beads controlled the thickness of the cell which varied between 5-20 μm. Pure and dye doped commercial nematic LCs from Merck were used. The pure nematic LCs were dyed by pleochroic dyes selected from D131, D81, D102 (from Merck) or nonpleochroic dye Oil Blue N, Pigment Blue 15 (copper phthalocyanine) (from Aldrich). A list of the LCs used is given in the Table 1. These were doped with titanium dioxide particles. The TiO$_2$ were R700, R900 R931, R706, R102, R105 with size 0.3-0.4 micron (from DUPONT) and SiO$_2$ covered: white TiO$_2$ pigment WP-10S, coloured pigments RP-10S(red), BP-10S(black), DP-10S (yellow) (from CATALYSTS & CHEMICALS IND.CO., LTD) with size 0.2-0.3 micron. The concentration of the particles in the LC varied between 5-50%. Unipolar pulses with amplitude 10-80 V, and pulses of 1-50 ms duration were applied to the cell.

TABLE 1

|  | $\epsilon_\parallel$ | $\epsilon_\perp$ | $\Delta\epsilon > 0$ | $\epsilon_\parallel / \epsilon_\perp$ |
|---|---|---|---|---|
| Nematic LC with $\Delta\epsilon > 0$ | | | | |
| E7 | 19.0 | 5.2 | 13.8 | 3.65 |
| ZLI2293 | 14.1 | 4.1 | 10.0 | 3.4 |
| ZLI4792 | 8.3 | 3.1 | 5.2 | 2.67 |
| MLC6204-000 | 44.8 | 9.5 | 35.3 | 4.72 |
| MLC6440 | 42.3 | 8.4 | 33.9 | 5.0 |
| MLC6639 | 36.6 | 8.0 | 28.6 | 4.57 |
| MLC6436-000 | 36.0 | 6.0 | 30.0 | 6.0 |
| MLC6413 | 11.7 | 4.4 | 7.3 | 2.66 |
| ZLI2222-100 | 4.8 | 3.0 | 1.8 | 1.6 * |
| Dyed Nematic LC (pleochroic dye) | | | | |
| ZLI4756/2 | 16.3 | 4.8 | 11.5 | 3.4 |
| ZLI4714/3 | 10.0 | 3.5 | 6.5 | 2.86 |
| ZLI4727 | 9.6 | 3.6 | 6.0 | 2.67 |
| ZLI3572 | 7.9 | 3.4 | 4.5 | 2.32 |
| Nematic LC with $\Delta\epsilon < 0$ | | | | |
|  | $\epsilon_\parallel$ | $\epsilon_\perp$ | $\Delta\epsilon < 0$ | $\epsilon_\perp / \epsilon_\parallel$ |
| ZLI4788-000 | 4.5 | 10.2 | −5.7 | 2.26 |
| ZLI1831 | 4.3 | 4.9 | −0.6 | 1.06 * |

*insignificant electrophoretic effect

As can be seen from Table 1, the threshold electrophoretic effect compatible with video frame rates is exhibited where the dielectric anisotropy of the liquid crystal is greater than about +2 or less than about −2. ZLI2222-100 ($\Delta\epsilon$+1.8) and ZLI1831 ($\Delta\epsilon$−0.6) both exhibited insignificant electrophoretic effect.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the spirit and scope of the present invention as specified in the accompanying claims.

The invention claimed is:

1. An electrophoretic liquid crystal display device comprising:
   two opposed cell walls enclosing a layer of an electrophoretic composition comprising a liquid crystal material having finely divided pigment particles dispersed therein;
   a plurality of electrode structures on an inner surface of each cell wall for applying an electric field across at least some of the liquid crystal material, opposed regions of electrode structures on each cell wall defining pixels;
   wherein the liquid crystal material has a dielectric anisotropy greater than about +2 or less than about −2;
   wherein pigment particles at low dielectric permittivity have stable locations in space between the electrodes and move electrophoretically with increasing dielectric permittivity; and
   wherein at least one of said cell walls is translucent and has an inner surface that is configured to exhibit low energy characteristics.

2. A device according to claim 1, wherein said particles have a size in the range 100 nm-1 μm.

3. A device according to claim 1, wherein said particles have a size in the range 200 nm-500 nm.

4. A device according to claim 1, wherein said liquid crystal material has a dye dissolved therein.

5. A device according to claim 4, wherein said dye is a non-pleochroic dye.

6. A device according to claim 1, wherein said liquid crystal material is a nematic liquid crystal.

7. A device according to any claim 1, wherein said liquid crystal material contains a chiral dopant.

8. A device according to claim 1, wherein said pigment particles are present in an amount of 10-50% by weight of said composition.

9. An electrophoretic liquid crystal display device comprising:
   two opposed cell walls enclosing a layer of an electrophoretic composition comprising a liquid crystal material having finely divided pigment particles dispersed therein;
   a plurality of electrode structures on an inner surface of each cell wall for applying an electric field across at least some of the liquid crystal material, opposed regions of electrode structures on each cell wall defining pixels;
   wherein the liquid crystal material has a dielectric anisotropy greater than about +2 or less than about −2; and p1 wherein at least one of said cell walls is translucent and has an inner surface that induces a substantially homeotropic local alignment of adjacent molecules of said liquid crystal material.

10. A device according to claim 9, wherein said particles have a size in the range 100 nm-1 μm.

11. A device according to claim 9, wherein said particles have a size in the range 200 nm-500 nm.

12. A device according to claim 9, wherein said liquid crystal material has a dye dissolved therein.

13. A device according to claim 12, wherein said dye is a non-pleochroic dye.

14. A device according to claim 9, wherein said liquid crystal material is a nematic liquid crystal.

15. A device according to any claim 9, wherein said liquid crystal material contains a chiral dopant.

16. A device according to claim 9, wherein said pigment particles are present in an amount of 10-50% by weight of said composition.

17. An electrophoretic liquid crystal display device comprising:
   two opposed cell walls enclosing a layer of a liquid crystal material having finely divided first pigment particles and finely divided second pigment particles dispersed therein, at least one of the cell walls being translucent;
   a plurality of electrode structures on an inner surface of each cell wall for applying an electric field across at least some of the liquid crystal material, opposed regions of electrode structures on each cell wall defining pixels;
   wherein the liquid crystal material has a dielectric anisotropy greater than about 2 or less than about −2;
   wherein the inner surface of at least one of the cell walls is of low energy; and
   wherein said first pigment particles will acquire a positive electric charge in said liquid crystal material, and said second pigment particles will acquire a negative electric charge;
   whereby said first pigment particles will be attracted towards one of said cell walls and said second pigment particles will be attracted towards the other of said cell walls when a suitable electric field is applied via said electrode structures.

18. An electrophoretic liquid crystal display device comprising:
   two opposed cell walls enclosing a layer of a liquid crystal material having finely divided first pigment particles and finely divided second pigment particles dispersed therein, at least one of the cell walls being translucent;
   a plurality of electrode structures on an inner surface of each cell wall for applying an electric field across at least some of the liquid crystal material, opposed regions of electrode structures on each cell wall defining pixels;
   wherein the liquid crystal material has a dielectric anisotropy greater than about 2 or less than about −2;
   wherein the inner surface of at least one of the cell walls induces a substantially homeotropic local alignment of adjacent molecules of said liquid crystal material; and
   p1 wherein said first pigment particles will acquire a positive electric charge in said liquid crystal material, and said second pigment particles will acquire a negative electric charge;
   whereby said first pigment particles will be attracted towards one of said cell walls and said second pigment particles will be attracted towards the other of said cell walls when a suitable electric field is applied via said electrode structures.

19. An electrophoretic liquid crystal display device comprising:
   two opposed cell walls enclosing a layer of a nematic liquid crystal material having finely divided pigment particles dispersed therein, at least one of said cell walls being translucent;
   a plurality of electrode structures on an inner surface of each cell wall for applying an electric field across at least some of the liquid crystal material, overlapping regions of opposed electrode structures on each cell wall defining pixels;
   wherein said liquid crystal material is substantially homeotropically aligned in the absence of an applied electric field and has a dielectric anisotropy greater than about 2 or less than about −2.

20. An electrophoretic liquid crystal display device comprising:

two opposed cell walls enclosing a layer of a liquid crystal material having finely divided pigment particles dispersed therein;

a plurality of electrode structures on an inner surface of each cell wall for applying an electric field across at least some of the liquid crystal material, overlapping regions of opposed electrode structures on each cell wall defining pixels;

wherein the liquid crystal material has a dielectric anisotropy greater than about 2 or less than about −2; and p1 wherein at least one of said cell walls is translucent and has an inner surface that does not induce uniform planar alignment of adjacent molecules of said liquid crystal material.

21. An electrophoretic liquid crystal display device comprising:

opposed first and second cell walls enclosing a layer of a liquid crystal material which has a dielectric anisotropy greater than about +2 or less than about −2 and which has finely divided pigment particles dispersed therein;

a plurality of row electrodes on an inner surface of one of said cell walls and a plurality of column electrodes on an inner surface of the other of said cell walls, said row and column electrodes being arranged in an X-Y matrix for applying an electric field across at least some of said liquid crystal material;

a plurality of X line driving circuits and a plurality of Y line driving circuits, said plurality of X and Y line driving circuits respectively connected to said plurality of row electrodes and said plurality of column electrodes so that the simultaneous application of suitable electric potentials to a row electrode and a column electrode will cause a threshold voltage of a predetermined threshold value to be applied across liquid crystal material between said electrodes; and p1 wherein at least said first cell wall is translucent and has an inner surface that is configured to have low energy characteristics;

whereby application of said threshold voltage will cause pigment particles to migrate to said first cell wall or to migrate away from said first cell wall depending on the polarity of said threshold voltage, but application of a voltage less than said threshold value will cause substantially no migration of said pigment particles.

22. A device according to claim 21, wherein said liquid crystal material is substantially non-aligned in the absence of an applied electric field.

23. A device according to claim 21, wherein the dielectric permittivity of said liquid crystal material will change from a lower value in an electric field below said threshold voltage to a higher value in an electric field above said threshold voltage.

24. An electrophoretic liquid crystal display device comprising:

opposed first and second cell walls enclosing a layer of a liquid crystal material which has a dielectric anisotropy greater than about +2 or less than about −2 and which has finely divided pigment particles dispersed therein;

a plurality of row electrodes on an inner surface of one of said cell walls and a plurality of column electrodes on an inner surface of the other of said cell walls, said row and column electrodes being arranged in an X-Y matrix for applying an electric field across at least some of said liquid crystal material;

a plurality of X line driving circuits and a plurality of Y line driving circuits, said plurality of X and Y line driving circuits respectively connected to said plurality of row electrodes and said plurality of column electrodes so that the simultaneous application of suitable electric potentials to a row electrode and a column electrode will cause a threshold voltage of a predetermined threshold value to be applied across liquid crystal material between said electrodes; and wherein at least said first cell wall is translucent and has an inner surface that induces a substantially homeotropic local alignment of adjacent molecules of said liquid crystal material;

whereby application of said threshold voltage will cause pigment particles to migrate to said first cell wall or to migrate away from said first cell wall depending on the polarity of said threshold voltage, but application of a voltage less than said threshold value will cause substantially no migration of said pigment particles.

25. An electrophoretic liquid crystal display device comprising:

opposed first and second cell walls each having a substantially planar inner surface and enclosing a layer of a liquid crystal material;

said liquid crystal material having a dielectric anisotropy greater than about +2 or less than about −2 and having finely divided pigment particles dispersed therein;

electrode means on an inner surface each cell wall for applying an electric field across at least some of said liquid crystal material in a direction substantially perpendicular to said planes of said inner surfaces; and wherein at least said first cell wall is translucent and has alignment means on an inner surface for inducing a substantially homeotropic local alignment of adjacent molecules of said liquid crystal material;

whereby application of a threshold voltage will cause pigment particles to migrate to said first cell wall or to migrate away from said first cell wall depending on the polarity of said threshold voltage, but application of a voltage less than said threshold value will cause substantially no migration of said pigment particles.

26. A method of manufacturing an electrophoretic liquid crystal display device, the method comprising: providing two opposed, spaced-apart cell walls, each of which has a plurality of electrode structures on an inner surface thereof, with overlapping regions of opposed electrode structures on each cell wall defining pixels; filling a space between said cell walls with a composition comprising a liquid crystal material having finely divided pigment particles dispersed therein and having a dielectric anisotropy greater than about +2 or less than about −2; providing a peripheral seal around the edges of said cell walls to retain said composition in said space; and wherein at least one of said cell walls is translucent and has an inner surface that is of low energy.

27. A method of manufacturing an electrophoretic liquid crystal display device, the method comprising:

providing two opposed, spaced-apart cell walls, each of which has a plurality of electrode structures on an inner surface thereof, with overlapping regions of opposed electrode structures on each cell wall defining pixels;

filling a space between said cell walls with a composition comprising a liquid crystal material having finely divided pigment particles dispersed therein and having a dielectric anisotropy greater than about +2 or less than about −2;

providing a peripheral seal around the edges of said cell walls to retain said composition in said space; and p1 wherein at least one of said cell walls is translucent and has an inner surface that will induce a substantially homeotropic alignment of adjacent molecules of said liquid crystal material.

* * * * *